April 24, 1956  K. C. ALLEN ET AL  2,742,811
COMPUTING SCALE HAVING MAGNIFYING MEANS
Filed May 12, 1953  2 Sheets-Sheet 2
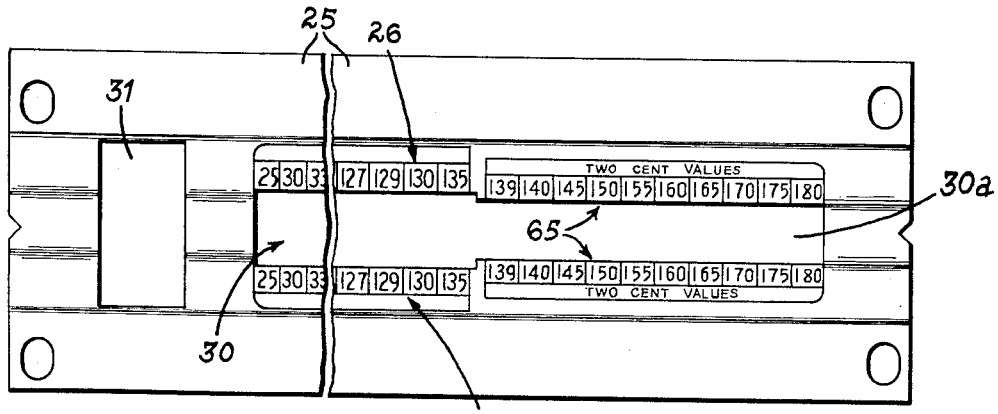
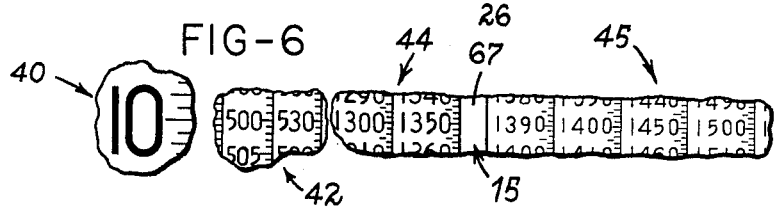
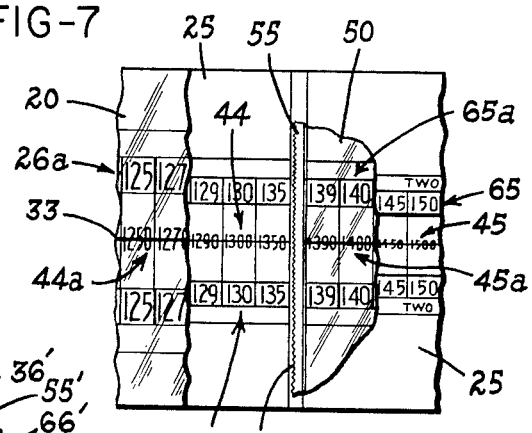
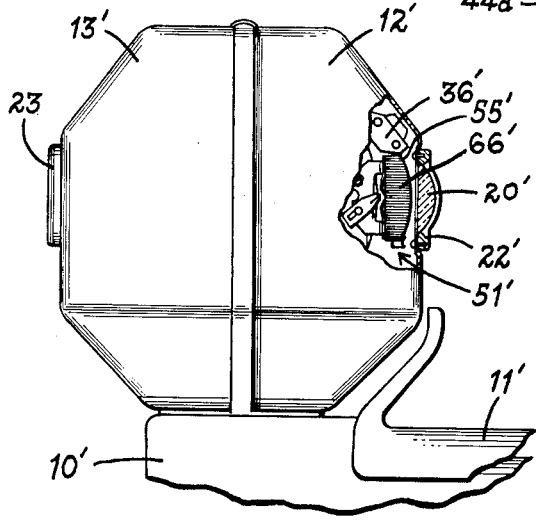
INVENTORS
KENNETH C. ALLEN,
DAVID A. MEEKER &
ERNEST A. REUSSENZEHN
BY
ATTORNEYS

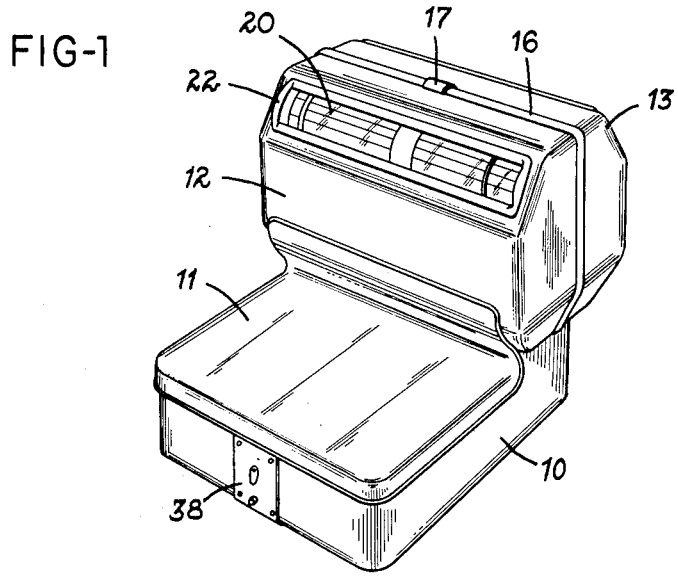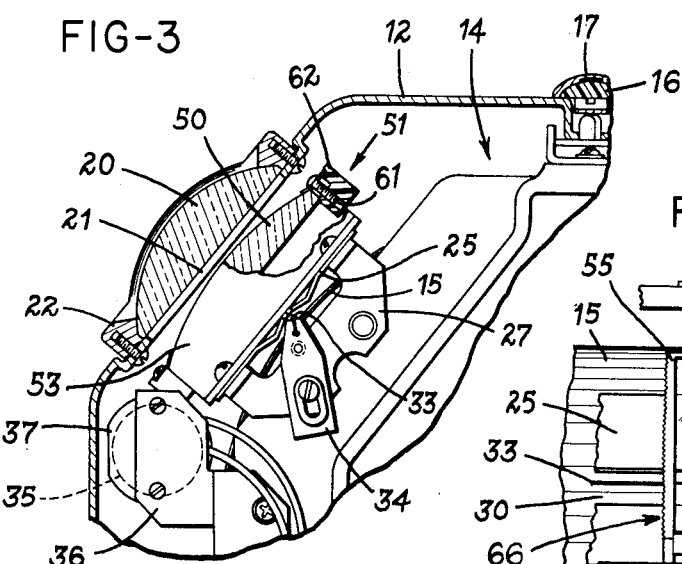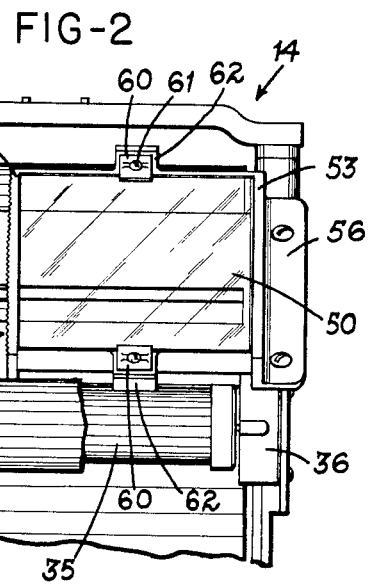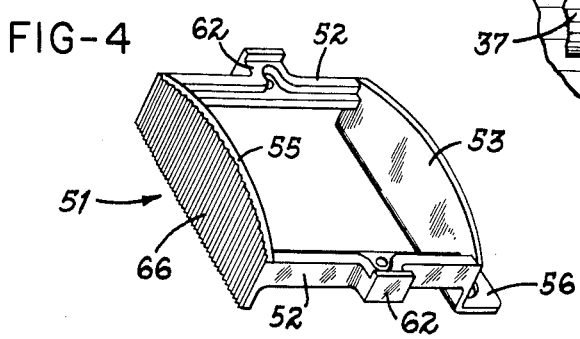

United States Patent Office 2,742,811
Patented Apr. 24, 1956

2,742,811

COMPUTING SCALE HAVING MAGNIFYING MEANS

Kenneth C. Allen, Dayton, David A. Meeker, Troy, and Ernest A. Reussenzehn, Dayton, Ohio, assignors to The Hobart Manufacturing Company, Troy, Ohio, a corporation of Ohio Application May 12, 1953, Serial No. 354,592

3 Claims. (Cl. 88—1)

This invention relates to computing scales.

The invention has special relation to computing scales of the type provided with a chart having computed values thereon corresponding to a substantial range of unit prices. State laws with respect to weights and measures require generally that the designations of computed values on such scales must not be less than a specified minimum size nor have less than a specified minimum relative spacing, and also that the graduations of the computed values must not exceed one cent in the lower unit price range and must in no event exceed two cents. It follows necessarily, however, that these designations are increasingly more closely spaced on a chart of uniform proportions in relation to the increase in the product of the unit price and the weight capacity of the scale, and this condition is especially apparent in scales provided with drum charts, on which the computed value designations are increasingly more closely spaced circumferentially of the drum with increase in the unit price.

On scales constructed to weigh commodities selling within a relatively low range of unit prices and/or to weigh only up to small maximum weights, it has not been difficult to provide a chart meeting these requirements without sacrificing readability. Thus on scales of low capacity or for operation within a low range of unit prices, it is possible to meet the legal requirements without magnification of the computed value designations. Also, since these requirements can be met if the designations are magnified to the proper size and spacing, it is possible within a considerable range of weights and unit prices to establish satisfactory reading conditions by the provision of a lens through which the designations on the chart are viewed.

Since the reading of a scale of this type is across a line extending axially of the drum chart, it is possible to use a single cylindrically curved lens to obtain the desired magnification, with such lens extending across the chart housing in line with the weight index marker of the scale. On the other hand, such lenses magnify only vertically, and while this is satisfactory for direct reading, it gives rise to considerable distortion when the line of sight is sidewise of the lens, owing to the fact that such viewing conditions cause variation in the length of the light path from the chart to the lens. Also, distortion effects increase towards the edges of cylindrical lenses, and these conditions tend to establish a practical limit to the tolerable amount of magnification obtainable with a cylindrical lens and also the height of the field which can be viewed without distortion through a cylindrical lens.

If the product of maximum price and maximum weight are properly correlated for a given scale, it is possible as noted to provide satisfactory viewing conditions with a single cylindrically curved lens and a drum chart, but it is increasingly difficult to obtain such results for higher ranges of weights and/or unit prices without undesirable distortion. In addition, with the unit prices of foods and like commonly weighed commodities tending to increase as they have in the recent past, it has been increasingly difficult to meet all these conflicting requirements without undesirably increasing the diameter of the drum chart and the resulting overall size of the scale.

In accordance with the present invention, these multiple requirements have been successfully met by a computing scale having a drum chart in which in addition to a cylindrically curved lens for viewing all of the computed value designations corresponding to each given weight, an auxiliary lens is interposed in fixed position in the line of sight through the main lens at the high value end of the chart. At the same time, and in order to prevent objectionable distortion resulting from this increased magnification, provision is made for restricting the field of view through the combined lenses. In particular, distortion is minimized along the edges of the lenses by reducing the height of the field, which is readily accomplished by reducing the height of the slot in the price face through which the high value end of the chart is viewed and by bringing correspondingly closer together the figures on this part of the price face, and if this reduction in the size of the slot and the price face figures is properly correlated with the magnified power of the auxiliary lens, the magnified sizes of the entire slot and figures on the price face will appear substantially uniform.

Further to reduce distortional effects, it is found desirable in accordance with the invention to reduce the sizes of the computed value designations on the chart in the high value area of the chart viewed through the auxiliary lens, and the sizes of these designations may also be correlated with the magnifying power of the auxiliary lens to establish generally uniform magnified image sizes for all of the computed value designations whether viewed through the single lens or through the combined lenses. In addition, if a suitable non-transparent baffle is interposed between the main lens and the chart at the junction between its high value area and the remainder of the chart, the view of the operator through the two lenses is limited to the high value area and also viewing of the smaller sized designations through the single lens is prevented, thus further controlling distortional effects and also avoiding viewing of the small sized designations at a magnification insufficient to meet the legal requirements.

It is accordingly a primary object of the present invention to provide a computing scale having a price face associated with a chart of computed values in which the chart includes computed values for a wide range of unit prices on the price face arranged in uniform price graduations and correspondingly increasingly closely spaced relation and which incorporates a magnifying system for the computed value designations correlated with the sizes of these designations and the figures on the price face to establish substantially uniform magnified image sizes for these designations and figures over the entire range of the scale with a minimum of objectionable distortional effects.

An additional object of the invention is to provide a computing scale as outlined above in which the desired uniform size effect of the magnified computed value designations and price face figures is obtained by means of a main lens arranged to view the entire related area of the chart and price face and an auxiliary lens cooperating with the main lens for viewing only the area where the computed value designations correspond to the highest range of unit prices and are correspondingly more closely spaced and preferably of smaller actual size.

It is also an object of the invention to provide a computing scale as outlined above in which the field of view through the auxiliary lens is limited to a desired small portion of the chart and price face in order to minimize distortional effects resulting from oblique viewing of the chart through the aligned lenses and along the marginal edges of the lenses.

Other objects and advantages of the invention will be apparent from the following description, the accompanying drawings and the appended claims.

In the drawings—

Fig. 1 is a perspective view showing a computing scale constructed in accordance with the present invention;

Fig. 2 is an enlarged view in front elevation showing the auxiliary lens mounted in position and with the housing removed;

Fig. 3 is a view looking from right to left in Fig. 2 with the housing and certain other parts partly broken away and in section;

Fig. 4 is a detail view in perspective showing the frame for the auxiliary lens;

Fig. 5 is an enlarged fragmentary view showing portions at both ends of the price face of the scale of Figs. 1–3;

Fig. 6 is an enlarged view of fragments of the drum chart in Figs. 1–3;

Fig. 7 is a somewhat diagrammatic elevational view showing a reading position of the scale and with portions broken away at a plurality of levels in order to illustrate the operation of the associated parts; and Fig. 8 is a fragmentary side elevational view, partly broken away, showing a modified arrangement of the scale of Fig. 1.

Referring to the drawings, which illustrate preferred embodiments of the invention, Fig. 1 shows a computing scale in which the base 10 is generally rectangular and encloses the weighing mechanism which supports the platter 11. A generally hexagonal housing composed of front and back sections 12 and 13 is mounted at the rear of the base to enclose the head assembly 14 supporting the rotatable drum chart 15 which carries the designations of weight and computed value. The trim 16 and trim cap 17 cover the joint between the housings sections 12 and 13 to give a finished appearance to this part of the scale.

The scale shown in Fig. 1 has the viewing area for the chart on the inclined upper surface of the front housing section 12, with this viewing area defined by a cylindrically curved lens 20 overlying an opening 21 in the housing and held in place by a frame 22 bolted to the housing. Fig. 8 shows a similar scale in accordance with the invention which is constructed for reading from directly in front, with the lens 20' and frame 22' mounted on the vertical front face of the housing section 12'. There is also provided a viewing opening for the customer at the back of the scale to view the weight recorded thereby, and Fig. 8 indicates the frame 23 for such a viewing opening on the vertical face of the back housing section 13'. A similar viewing opening (not shown) for the customer is provided on the inclined face of the back housing section 13 of the scale of Fig. 1.

The drum chart 15 operates in combination with the price face 25 to give the computed values for the selected range of unit prices in accordance with the actual weight determined by the scale and the unit price designations indicated along the price face 25 as shown at 26 in Fig. 5. The price face is carried by brackets 27 at each end of the head assembly 14 and lies between the lens 20 and the chart 15. It is slotted at 30 to expose the desired area of the chart, and the designations 26 of unit price are arranged on both sides of this slot for the convenience of the operator. An additional aperture 31 at the left hand end of the price face overlies the designations of weight on the chart 15, and the index wire 33 is mounted by holders 34 on the head assembly 14 in accurately aligned relation with the centers of the openings 30 and 31 and thus in laterally fixed relation with the lens 30 and chart 15. This whole portion of the scale is shown as illuminated by a fluorescent tube 35 mounted by sockets 36 at either end of the head assembly and provided with a shield 37 for limiting the illumination of the chart to the area thereof in the field of lens 20. The switch and switch plate for light tube 35 are indicated at 38 in Fig. 1.

Figs. 5 and 6 show the cooperative relation of the chart 15 and price face 25. The unit price designations 26 are selected in accordance with the prices per pound expected to be used for the commodities to be weighed on the scale. The designations on the chart are computed accordingly, and Fig. 6 shows fragments of the chart illustrating this arrangement. At the left hand end of the chart are the weight designations indicated at 40 and divided in appropriate pounds, ounces and fractions of an ounce, and the unit prices 26 increase from left to right across the price face. The computed values 42 for the lower unit prices are readily arranged in graduations of one cent, but for the higher unit prices, these values become so increasingly closely spaced that their graduations are increased to two cents as indicated at 44.

It has been found that with the chart of a generally established diameter of the order of eight and one-half inches, it is possible to maintain satisfactory sizes for the designations 44 up to a total value of the order of $25.00 and at the same time to meet the legal requirements for the magnified sizes of these designations without undesirable distortion with a single cylindrical lens 20. If, however, it is attempted to increase the capacity of the chart for unit prices and weights by decreasing the size of the computed value designations and increasing the power of the cylindrically curved lens 20, the resulting distortional effects tend to become objectionable, especially when the chart is viewed at an angle other than directly through the lens.

In accordance with the present invention, this difficulty is obviated by reducing the size and circumferential spacing of the computed value designations only at the end of the chart related to the highest range of unit prices, as indicated at 45, and by providing an auxiliary lens 50 in the line of view through the main lens to the chart but with the magnifying action of this auxiliary lens 50 confined to the area of the chart having the small sized figures 45 thereon. It will be noted, however, in Fig. 6 that the reduction in the size of figures 45 as compared with figures 44 is limited to essentially the vertical direction, i. e., circumferentially of the drum, and their spacing laterally need not vary from that of the figures 44. Also, the graduation lines for figures 45 are preferably correspondingly lighter than for figures 44.

The auxiliary lens 50 is shown as a cylindrically curved lens of approximately the same or slightly greater width than main lens 20 but of considerably lower magnifying power. Thus in order to establish effectively uniform image sizes for all the computed value figures, the lens 50 is selected to provide such magnification in combination with main lens 20 that the final magnified sizes of the figures 45 viewed through both lens effectively equal the magnified sizes of the figures 42 and 44 viewed only through the main lens. Thus if the magnification of lens 20 is 1.8 ×, satisfactory results may be obtained with the scale so designed that the total magnification of the two lenses is substantially 2.2 ×, with the auxiliary lens thus providing approximately 20% extra magnification.

The auxiliary lens 50 is shown as mounted within the housing section 12 and between the chart 15 and main lens 20 by means of a frame 51 of generally rectangular shape which includes side bars 52 and end plates 53 and 55. Satisfactory results have been obtained by molding the frame 51 as a unit from a suitable plastic such as polystyrene, and the outer end plate 53 includes a flange 56 adapted to be bolted to the right hand end bracket 27 which supports the price face. The lens 50 is shown as mounted in frame 51 by means of clips 60 such as sheet metal nuts secured by screws 61 to lug portions 62 of the frame side bars 52.

In order to minimize distortional effects along the edges of the image produced by the combined lenses, provision is made for reducing the height of the field of view at this part of the scale. Thus the width of that portion of the slot 30 in the price face which overlies the smaller sized figures 45 is reduced as shown at 30a in Fig. 5, with the relative sizes of the slot portions 30 and 30a being preferably substantially the same as the relative sizes of the computed value designations 44 and 45, so that the image of the entire slot will appear of uniform width. The unit price figures 65 on the price face along the slot portion 30a are therefore brought closer together, and also they are desirably of similarly reduced size in proportion to the magnifying power of the auxiliary lens.

As noted, it is desirable to confine the magnifying action of the auxiliary lens to the area substantially directly in line therewith. In order therefore to limit the portion of the chart visible sidewise through lens 50, a nontransparent but preferably light-transmitting baffle is provided between the main lens and the price face. Such baffle is readily formed by the side plate 55 of the lens frame, and if this frame is of transparent material such as the polystyrene mentioned above, the outer face of this plate may be serrated or otherwise rendered nontransparent as indicated at 66. This baffle arrangement has the additional advantage of preventing viewing of the small sized figures through the main lens alone, which could result both in distortion and also in magnifying these figures to a size too small to meet the legal requirements. The figures 44 and 45 are separated as shown in Fig. 6 to leave a space 67 underlying this baffle 66.

If the several parts are arranged as described, the operation as a whole is as illustrated somewhat diagrammatically in Fig. 7. The relative actual sizes and spacing of the small sized computed value designations and their related unit price figures are indicated at 45 and 65 respectively at the right hand end of Fig. 7. The sizes of these figures as viewed through the auxiliary lens 59 are represented at 45a and 65a respectively, and it will be noted that these magnified figures are approximately equal in size to the adjacent unmagnified figures 44 and 26. The final magnified sizes of these figures are represented at 44a and 26a at the left hand end of Fig. 7, and it will be understood that the finally magnified images of the smaller sized figures will be approximately equal in size to these images 44a and 26a.

As noted above, the invention is applicable to scales of this general class arranged for viewing from either angularly above or directly in front as shown in Figs. 1 and 8 respectively. This is illustrated in more detail in the broken out portion in Fig. 8, wherein the parts of the auxiliary lens assembly have been designated as 51', 55' and so forth. The mode of operation is the same with either form of scale, and the major difference for these parts is that the relative positions of the lenses and the illuminating tube are reversed in the two forms of scale, with the tube being above the lenses in Fig. 8 instead of below the lenses as in Figs. 2 and 3. Both forms of scale provide the same advantages of increased ranges of unit prices and computed values over desired wide ranges of weights.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a computing scale including a price face and a chart therein having computed values arranged in different series of price graduations and in progressively more closely spaced relation, the combination of means defining a first viewing opening in said price face located in laterally fixed relation with respect to said chart and overlying a portion of said series of price graduations on said chart including those which are relatively more widely spaced, means defining a second viewing opening in said price face located in fixed laterally spaced relation with and of lesser width than said first viewing opening and overlying only the remaining more closely spaced said graduations, a cylindrical lens mounted in fixed overlying relation with both of said viewing openings to magnify said graduations, an auxiliary lens of substantially the same lateral extent as said second viewing opening mounted in laterally fixed aligned relation between said second viewing opening and said cylindrical lens to magnify said more closely spaced graduations, said auxiliary lens being of predetermined magnifying power cooperating with said cylindrical lens to provide greater magnification of the width of said second viewing opening and the spacing of said graduations viewed therethrough than the magnification by said cylindrical lens of the width of said first viewing opening and the spacing of said graduations viewed therethrough, and baffle means located adjacent the laterally inner end of said auxiliary lens in fixed relation with said price face and limiting the angular field of view through said second viewing opening to said aligned lenses in order to prevent viewing of said closely spaced graduations through said cylindrical lens alone.

2. In a computing scale including a price face and a chart having computed values arranged in different series of price graduations and in progressively more closely spaced relation, the combination of means defining a first viewing slot in said price face located in laterally fixed relation with respect to said chart and overlying a portion of said series of price graduations on said chart including those which are relatively more widely spaced, means defining a second viewing slot in said price face located in fixed laterally spaced relation with and of lesser width than said first slot and overlying only the remaining more closely spaced said graduations, unit price figures on said price face along said slots and of larger size and lower value along said first slot and of smaller size and higher value along said second slot, a cylindrical lens mounted in fixed overlying relation with both of said slots to magnify said unit price figures and said graduations, an auxiliary lens of substantially the same lateral extent as said second viewing opening mounted in laterally fixed aligned relation between said price face and said cylindrical lens, and said auxiliary lens being of predetermined magnifying power cooperating with said cylindrical lens to provide greater magnification of the spacing of said graduations viewed therethrough than the magnification by said cylindrical lens of the spacing of said graduations viewed therethrough and to increase the apparent width of said second slot and the size of said smaller unit price figures to approximately the same width as said first slot and the size of said larger unit price figures respectively.

3. In a computing scale including a price face and a chart having computed values arranged in different series of price graduations and in progressively more closely spaced relation, the combination of means defining a first viewing slot in said price face located in laterally fixed relation with respect to said chart and overlying a portion of said series of price graduations on said chart including those which are relatively more widely spaced, means defining a second viewing slot in said price face located in fixed laterally spaced relation with and of lesser width than said first slot and overlying only the remaining more closely spaced said graduations, unit price figures on said price face along said slots and of larger size and lower value along said first slot and of smaller size and higher value along said second slot, a first lens means mounted in fixed overlying relation with said first slot to magnify said unit price figures and said more widely spaced graduations, a second lens means of different magnifying power from said first lens means mounted in laterally fixed overlying relation with said second slot to magnify said unit price figures along said second slot and said more closely spaced graduations, and said second lens means being of predetermined higher magnifying power than said first lens means to provide greater magnification of the spacing of said graduations viewed therethrough than the magnification by said first lens means of the spacing of said more widely spaced graduations viewed therethrough and to increase the apparent width of said second slot and the size of said smaller unit price figures to approximately the same width as said first slot and the size of said larger unit price figures respectively.

References Cited in the file of this patent

UNITED STATES PATENTS

| | | |
|---|---|---|
| 1,865,326 | Marshall | June 28, 1932 |
| 1,996,978 | Schmalholz | Apr. 9, 1935 |
| 2,178,155 | Williams | Oct. 31, 1939 |
| 2,198,714 | Williams | Apr. 30, 1940 |
| 2,211,189 | Williams | Aug. 13, 1940 |
| 2,223,773 | Williams | Dec. 3, 1940 |
| 2,370,982 | Marshall et al. | Mar. 6, 1945 |